United States Patent [19]
Napadow et al.

[11] Patent Number: 5,849,053
[45] Date of Patent: Dec. 15, 1998

[54] ENERGY CONSERVATION MEANS FOR A CONTROLLED ENVIRONMENT ROOM

[76] Inventors: Michael P. Napadow, 3N427 Willow, Elmhurst, Ill. 60126; Thomas L. Rowe, 24253 Marble Rd.-Box 304, Channahon, Ill. 60410

[21] Appl. No.: 931,588

[22] Filed: Sep. 16, 1997

[51] Int. Cl.⁶ .................................................. B05B 15/12
[52] U.S. Cl. ........................... 55/385.2; 55/471; 55/473; 55/485; 55/DIG. 18; 55/DIG. 46
[58] Field of Search .................... 55/385.2, 471, 55/473, 485, DIG. 18, DIG. 46

[56] References Cited

U.S. PATENT DOCUMENTS

| | | | |
|---|---|---|---|
| 4,401,445 | 8/1983 | Browning | 55/DIG. 46 |
| 4,506,665 | 3/1985 | Vohringer | 55/DIG. 46 |
| 4,865,628 | 9/1989 | Iwanczyk | 55/DIG. 46 |
| 5,063,835 | 11/1991 | Rockx | 55/DIG. 46 |
| 5,279,631 | 1/1994 | Pingel | 55/DIG. 46 |
| 5,346,553 | 9/1994 | Pingel | 55/DIG. 46 |

FOREIGN PATENT DOCUMENTS

| | | | |
|---|---|---|---|
| 3318043A1 | 11/1984 | Germany | 55/DIG. 46 |
| 61-1217638 | 9/1986 | Japan | 55/DIG. 46 |

OTHER PUBLICATIONS

Liberto, N., "Designing a powder–application Room: Why? How?", Powder Coating, Aug. 1993.

Bailey, J.M., "Powder Comes Full Cycle at Trek," Industrial Paint & Powder, Sep. 1996.

*Primary Examiner*—Jay H. Woo
*Assistant Examiner*—Minh-Chau T. Pham
*Attorney, Agent, or Firm*—Gerlach & O'Brien

[57] ABSTRACT

Energy conservation structure is provided for a controlled environment room having an opening in a wall thereof through which work is passed and through which room air under pressure may be discharged from the room, thereby to prevent contamination of the room air by contaminants in outside air entering the room through such opening, the energy conservation structure including structure providing suction adjacent to the wall opening to induce the flow of room discharge air thereto, the latter structure being constructed and arranged for communication with structure and apparatus for recycling the discharge air of such induced flow to the controlled environment room.

13 Claims, 4 Drawing Sheets

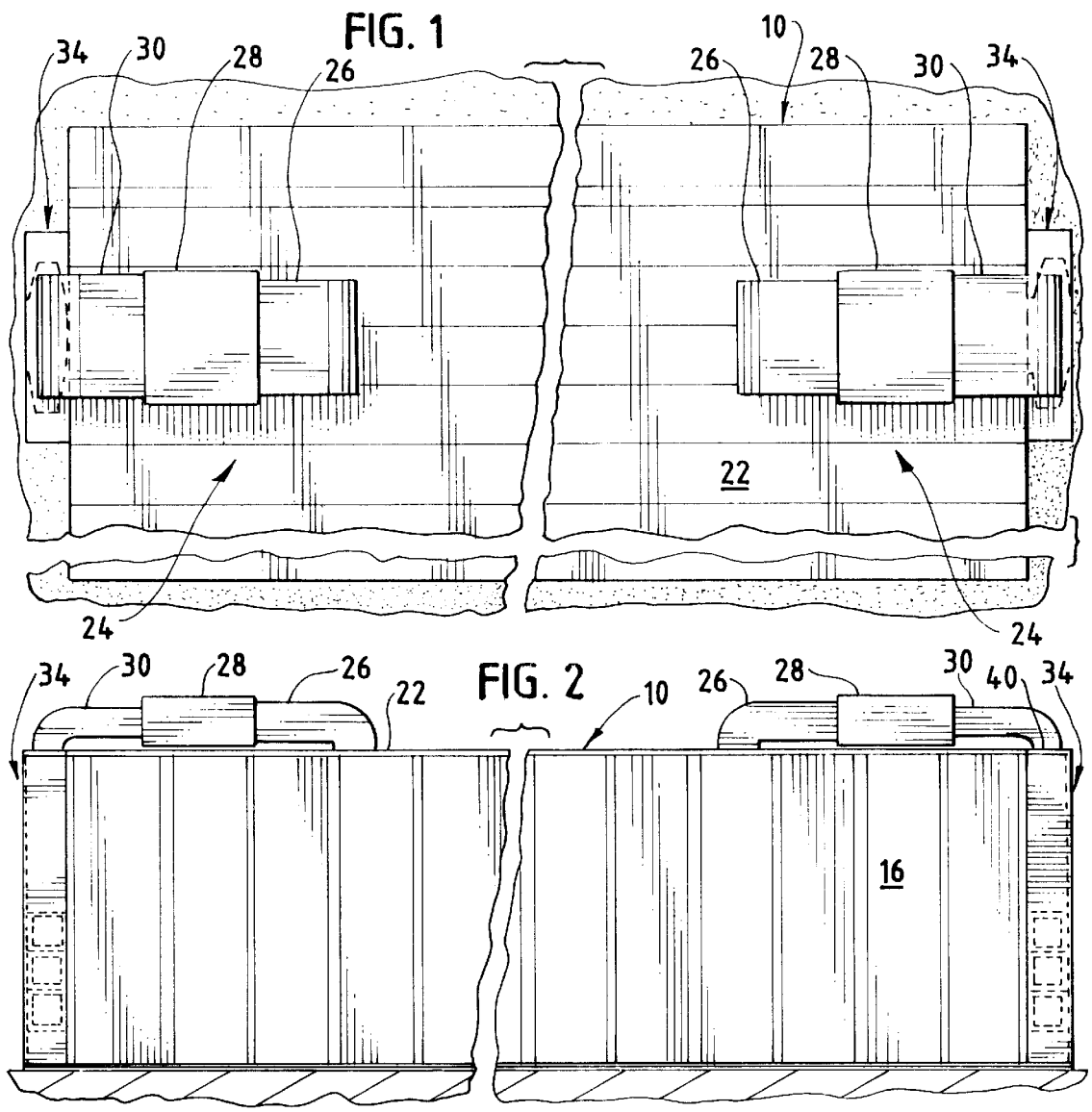
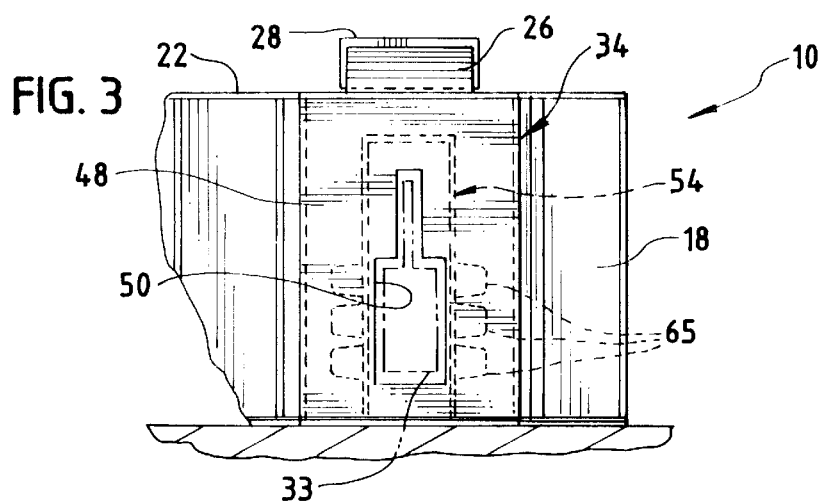

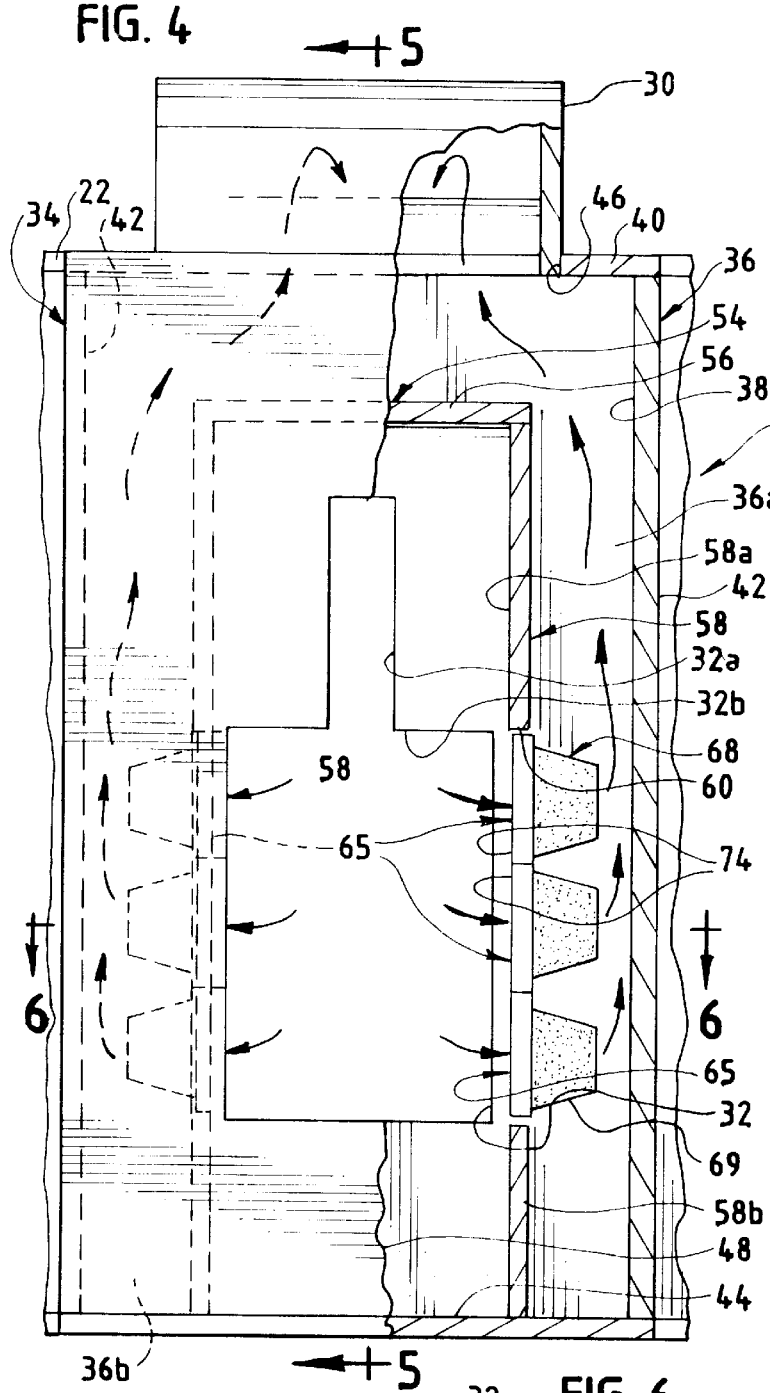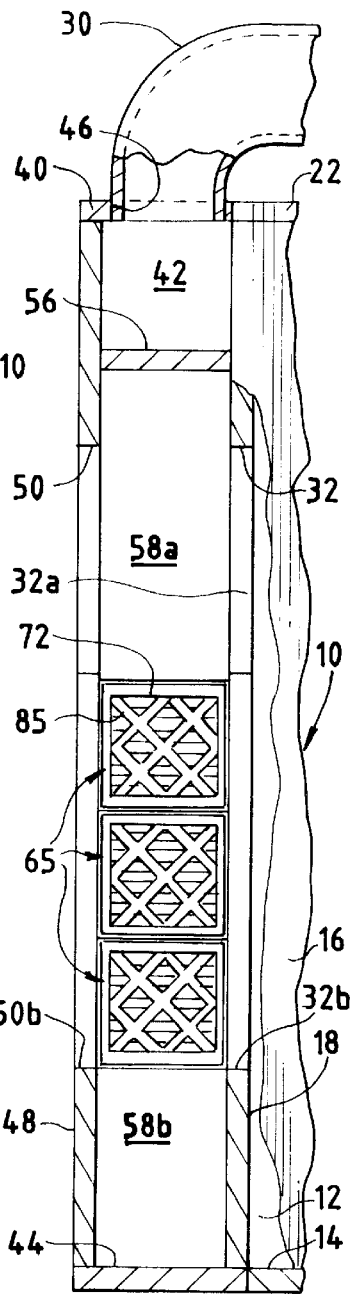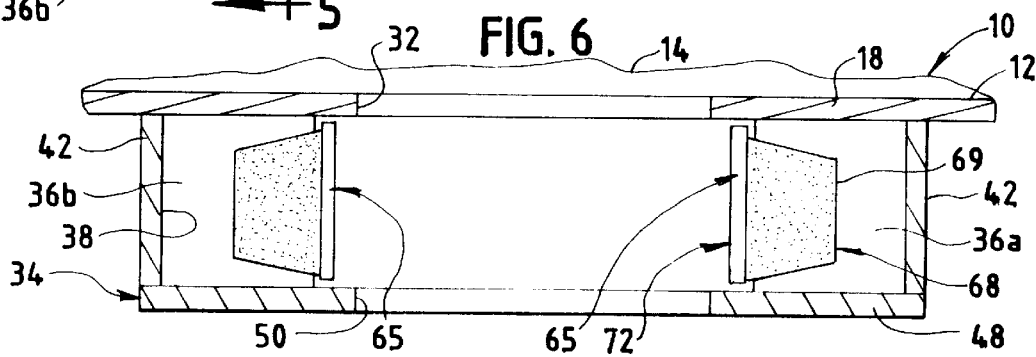

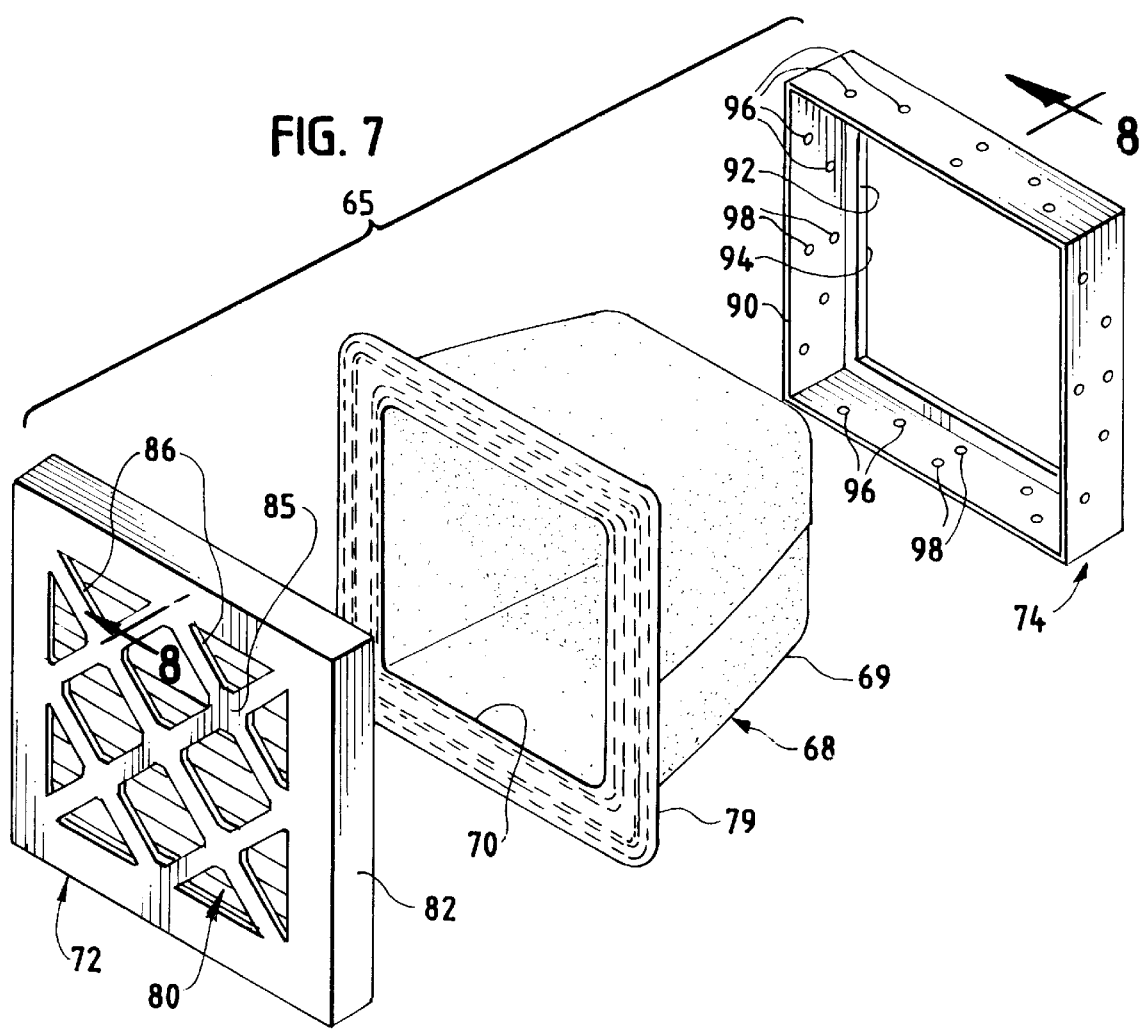
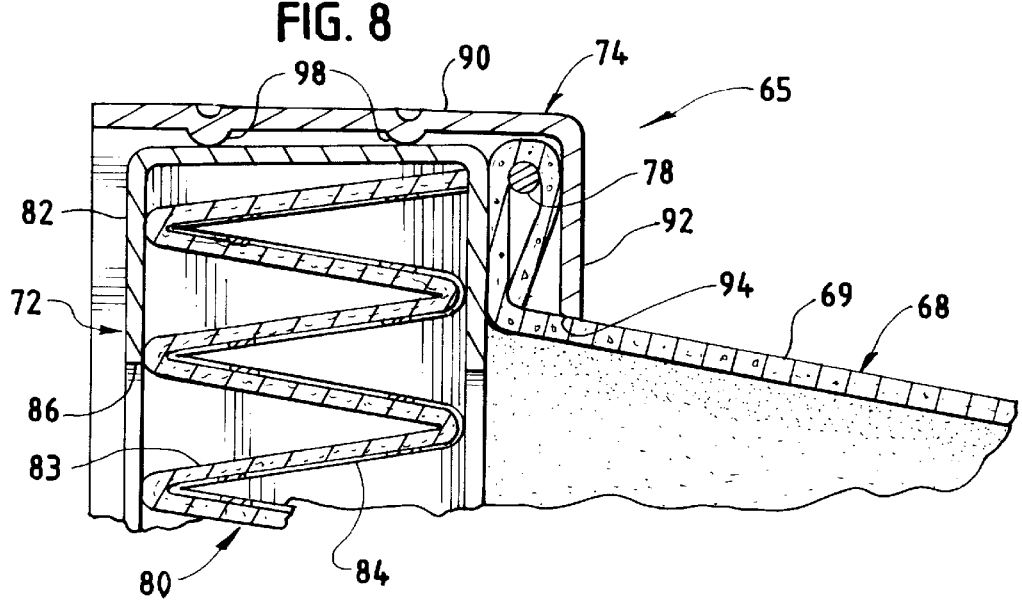

5,849,053

ENERGY CONSERVATION MEANS FOR A CONTROLLED ENVIRONMENT ROOM

This invention relates to controlled environment rooms, particularly, to energy conservation means therefor. More particularly, the invention relates to energy conservation means for powder coating rooms.

BACKGROUND OF THE INVENTION

Controlled environment or environmental rooms find important use in powder application processes. Thus, isolation of a process from a plant environment can make the difference between success and failure. Contaminants in the plant environment can be deposited on the work being coated. A powder application room provides optimal conditions for powder coating. (See article by Nick Liberto, "Designing a powder-application room: Why? How?", in *POWDER COATING*, August, 1993) It is important to control temperature and humidity, with humidity being important to the control of the electrostatic charge. (See article by Jane M. Bailey, "Powder Comes Full Cycle at Trek," in *INDUSTRIAL PAINT & POWDER*, September, 1996).

A controlled environment room may be constructed or erected within an industrial plant as a stand-alone room, in the room space of which temperature, humidity, and particle contaminants are closely controlled. The size of the room may vary widely, to accommodate one or more powder coating booths, and, as desired, to accommodate pretreatment and curing operations. Access may be provided for forklift trucks and parts conveyors. Return or recycled air and makeup air are filtered, to remove particles as small as two microns. The air is conditioned to provide typically a room environment of 40–70 percent humidity and 60°–80° F. room temperature for the sensitive powder coating operations.

A work may be processed in a controlled environment room while carried on a conveyor, as illustrated in the above-identified article by Jane M. Bailey. The work, for example, bicycle parts to be powder coated, may be conveyed between the outside and the inside of the room on the conveyor, prior to and/or following processing in the room. At the entrance to the room and the exit therefrom, the conveyor bearing the work travels through an opening in a wall of the room leading to an area or facility in the plant surrounding the room.

The surrounding environmental air in the plant may contain various contaminants, especially particles, and may have various temperature and humidity conditions. In order to prevent airborne contaminants from entering through the conveyor openings, the controlled environment room is pressurized, so as to discharge air under pressure from the room through the openings. Typically, air is discharged from the room through the openings at a velocity of approximately 120 feet per minute.

Prior to the invention, the air discharged from the conveyor openings and its energy content were dissipated in the surrounding plant environment. While air was recycled from the controlled environment or environmental room, after filtration and conditioning to regulate its temperature and its humidity, makeup air had to be supplied from the surrounding environment to replace lost air, filtered and conditioned, by cooling, heating, humidifying, and/or dehumidifying. The requirement for this more demanding treatment of the makeup air imposed high capital expenditure and operating costs.

SUMMARY OF THE INVENTION

An important object of the invention is to provide energy conservation means and methodology for a controlled environment or environmental room having a work opening in a wall thereof, whereby the energy previously lost in air discharged through the wall opening is saved, by recovering the discharged air for return to and reuse in the room.

Another important object is to provide such energy conservation means and methodology enabling a greater portion or all of the return air to the environmental room to be recovered as discharge air from such a work opening or openings, whereby the exit velocity of the discharge air may be increased significantly, for greater efficiency in preventing contaminants from entering the room via the opening or openings. Such greater room isolation from the surrounding environment results in better work processing, especially in the application of powder in a coating process.

A particular object is to provide energy conservation means and methodology that accomplish the foregoing objects when employed with a controlled environment room having a work opening in a wall thereof and a conveyor for the work extending through the opening.

Preferred energy conservation means for a controlled environment room having an opening in a wall thereof through which work is passed and through which room air under pressure may be discharged from the room, thereby to prevent contamination of the room air by contaminants in outside air entering the room through the opening, comprise means adapted for providing suction proximate to such opening to induce the flow of room discharge air thereto, and adapted for communication with means for recycling the discharge air of such induced flow to the room.

The energy conservation means in a further preferred embodiment are provided in an air supply system that includes means for filtering, conditioning, and blowing the return and makeup air for supply to the room, and means are provided for conducting the discharge air of such induced flow to the filtering, conditioning, and blowing means.

These and other objects, advantages and functions of the invention will be apparent on reference to the following description, taken in conjunction with the accompanying drawings.

BRIEF DESCRIPTION OF THE DRAWINGS

The drawings illustrate preferred embodiments of the energy conservation means and methodology for a controlled environment room, in accordance with the invention. In the drawings, like elements are identified by like reference symbols in each of the views, and:

FIG. 1 is a broken top plan view of a controlled environment or environmental room provided with one embodiment of energy conservation means, pursuant to the invention.

FIG. 2 is a broken side elevational view thereof;

FIG. 3 is a fragmentary end elevational view thereof, as seen viewing the structure of FIGS. 1 and 2 from the right as illustrated;

FIG. 4 is an enlarged broken away end elevational and partly vertical sectional view of a vestibule added at each of the opposite ends of the room, as illustrated in FIGS. 1–3;

FIG. 5 is a vertical sectional view of the vestibule, taken substantially on line 5—5 of FIG. 4;

FIG. 6 is a horizontal sectional view of the vestibule, taken substantially on line 6—6 of FIG. 4;

FIG. 7 is a further enlarged exploded perspective view of an air filter assembly illustrative of filter assemblies mounted in the vestibule;

FIG. 8 is a still further enlarged fragmentary sectional view of the components of the filter assembly of FIG. 7, as assembled.

DESCRIPTION OF THE PREFERRED EMBODIMENTS

First Embodiment

Figure 9:
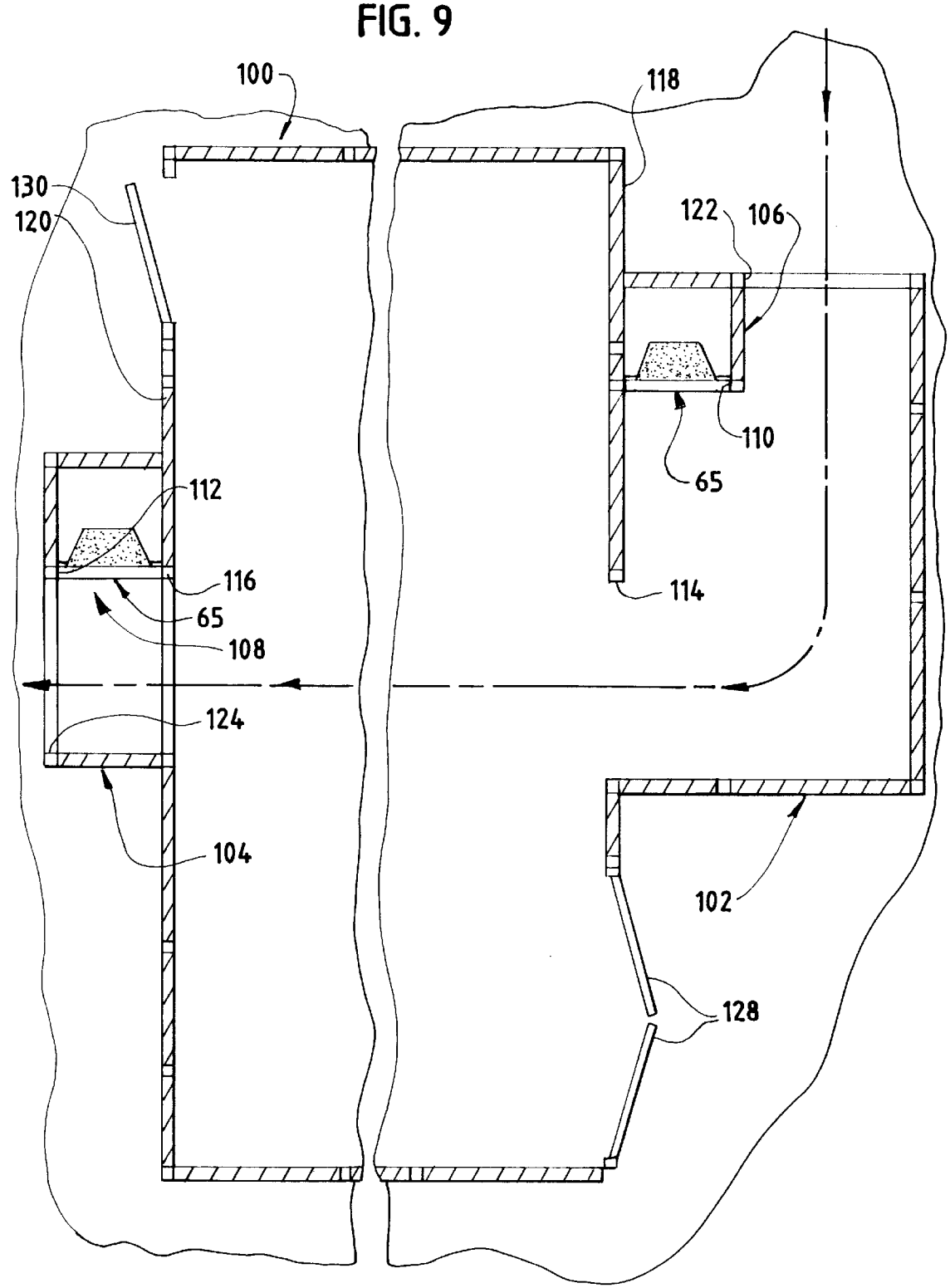
FIG. 9 is a broken horizontal sectional view of a controlled environment room provided with a second embodiment of energy conservation means, pursuant to the invention.

Referring to FIGS. 1–6 of the drawings, a controlled environment or environmental room 10 encompasses a rectangular room space 12 bounded by a horizontal floor 14, and vertical room side and end walls 16 and 18, respectively. The room 10 is closed by a roof or top closure 22, beneath which air distribution means for the room (not shown), which may be conventional, are mounted at the top of the room. The air distribution means are supplied with recycled or return air and makeup air by two air supply units 24, mounted on the roof 22 in the illustrative embodiment. Each unit 24 includes, successively, a room air supply conduit or duct 26 of rectangular cross section, an air conditioning unit 28, illustrated schematically, and a return air conduit or duct of rectangular cross section.

The air conditioning unit 28 is conventional, and it controls air temperature and humidity to maintain them in desired ranges, such as exemplified hereinabove. A blower in the air conditioning unit 28, not illustrated, supplies return air treated in the unit 28, under pressure to the supply conduit 26 and thence to the air distribution means for the room. The room air is maintained in the room space 12 at a small positive or superatmospheric pressure.

Prior to the invention, room air was recycled through filters and an air conditioning unit such as the unit 28, and makeup air treated similarly was added to the recycled air. Makeup air was necessary to replace air lost through various openings in the room walls, such as access doors and openings for the supply and removal of materials and work processed in the room. A large loss of room air, at or about the desired humidity and temperature, was suffered with rooms where the work was supplied and removed through wall openings, especially where conveyor lines extended through openings in the walls from the outside to the inside of the room.

In particular, supply and removal of parts on conveyors is employed in modern powder coating processes performed in controlled environment rooms. The large loss of air leaving the room through the conveyor openings at velocities of approximately of 120 feet per minute requires a correspondently large amount of energy and equipment to provide the necessary temperature and humidity in the makeup air. Pursuant to the invention, the air that otherwise would escape through the openings for supply and removal of the work is recovered or captured for recycling to the controlled environment room and reuse.

It is also very advantageous to fulfill all of the return air requirements by recycling air from the work openings in the wall, and dispense with the prior recycling of air removed from the room through wall-mounted filters. One result is that the velocity of the air exiting through the work openings may be markedly increased, to thereby increase the isolation of the room space 12 from the atmosphere outside of the room.

Referring to FIGS. 4–6, each room end wall 18 is provided with a conveyor or work opening 32, shaped and sized to accommodate a conveyor carrying work parts and extending through each of the openings 32. Such a conveyor and work part carried thereby are schematically illustrated in broken lines in PIG. 3 and identified by the number 33.

The conveyor opening 30 includes an upper, relatively narrow area 32a that accommodates a conveyor having work hangers depending from a conveyor belt or the like (not shown). A lower, relatively wide area 32b accommodates work parts (not shown), such as bicycle parts, removably carried by the hangers. The work is conveyed between the outside and the inside of the room 10, the direction of movement depending upon whether the work is being conveyed into or out of the room.

Room air exiting through a conveyor opening 32 in an end wall 18 of the room 10 is recovered employing a vestibule 34 framing the opening. The vestibule 34 includes a vacuum chamber 36 therein defining a vacuum space 38. The vestibule 34 and the vacuum chamber 36 both are hollow rectangular structures including a roof 40, two spaced apart parallel vertical side walls 42, and a floor 44. As illustrated, the roof 40 and the floor 44 may be coplanar with and constitute horizontal extensions of the roof 22 of the room and the floor 14 of the room, respectively. The vestibule side walls 42 project perpendicularly outwardly from the room end wall 18, on opposite sides of the conveyor opening 32. The vestibule roof 40 is provided with a central rectangular return air opening or exit 46, which receives the lower end of the return air conduit 30 mounted therein. The vestibule 34 and the chamber 36 have inner and outer end walls comprising the end wall 18 of the room 10 and a spaced apart parallel vertical wall 48, respectively. A conveyor opening 50 is provided in the outer end wall 48, in register or alignment with the conveyor opening 32 in the room end wall 18.

The vacuum chamber 36 is completed by an internal, inverted U-shaped air induction wall or hood 54. The induction wall 54 includes a horizontal top wall section 56, below and spaced apart from the roof 40. The induction wall 54 further includes two vertical inner side wall sections 58, each composed of parts 58a and 58b, at opposite ends of the top wall section 56, in depending relation. The side wall sections 58 are spaced apart inwardly from and parallel to respective outer side walls 42, to provide two vacuum chamber cells or compartments 36a and 36b, respectively. The parts 58a and 58b of each inner side wall section 58 are vertically spaced apart, to provide an air suction or induction opening 60 in each of the vacuum chamber cells 36a and 36b. The suction openings 60 are opposite to each other and closely proximate to the respective opposite side margins of the wide lower areas 32b and 50b of the conveyor openings 32 and 50.

The vacuum chamber 36 thus is made up of the external roof 40, the side walls 42, the floor 44, the internal air induction wall 54, the room end wall 18, and the outer vestibule end wall 48, which together define the vacuum space 38. The vacuum chamber 36 in this embodiment provides a tunnel or hood encompassing or surrounding the conveyor openings 32 and 50, and also encompassing a potential flow path of air discharged from the room 10 in the direction of the conveyor openings, at superatmospheric pressure. The vacuum chamber 36 communicates with the return air conduit 30 through the return air opening or exit 46 in the roof 40.

Mounted in each of the suction openings 60 in the induction side wall sections 58 is a group of three vertically contiguous rectangular air filter assemblies or modules 65.

Referring to FIGS. 7 and 8, the air filter assemblies 65 are constructed in a conventional manner of a cube filter 68 having a rectangular mouth 70 at an inner end thereof, a prefilter 72 covering the mouth 70 at such inner end, and a mounting frame 74 that removably receives the cube filter and prefilter therein. The cube filter 68 is a commercially available four-stage extended surface filter having a hollow body 69 made of polyester fabric. The filter provides four stages of filtration, to remove 100% of particles two microns or larger. Such removal is dictated by the powder manufacturing process. The filter fabric is woven in decreasing opening sizes, including, in order, open weave, coarse denier fibers for capturing larger particles on the inside of the filter body 69; close weave, spiral crimped, medium denier fibers for capturing medium sized particles; dense weave, small denier fibers for capturing small particles; and a final, outer layer of tackifier, incorporated into a dense weave of small denier fibers. As seen in FIG. 8, the mouth 70 of the cube filter 68 is surrounded by a rectangular wire ring 78, over which the inner end of the filter fabric is looped, to provide a relatively rigid rectangular filter flange 79 around the mouth.

The prefilter 72 is a commercially available, disposable unit composed of a pleated flat filter 80 enclosed in a boxlike rectangular frame 82. The filter 80 is made up of a flat fibrous mat 83 and a reinforcing and retaining coarse wire mesh 84 on the back or downstream surface of the mat. The filter 80 removes 40% of ASHRAE standard dust. The prefilter frame 82 includes front and back surface grids 85 providing a plurality of grid openings 86, for the induced flow of air through the filter 80.

The mounting frame 74 has a mouth 88 defined by a rectangular flat band 90. A rectangular flange 92 projects inwardly from the rim of the band at the back of the mouth 88, and it defines an opening 94 adapted to receive the body 69 of the cube filter 68 projecting therethrough. The band 90 is provided with mounting holes 96 in its sides, for insertion of rivets, screws, or other fasteners. Small bosses 98 project inwardly from the sides of the band 90, around the mouth 88.

The air filter assembly 65 is assembled as illustrated in FIG. 8, by inserting the body 69 of the cube filter 68 through the opening 94 in the mounting frame 74, from the front, until the flange 79 of the cube filter 68 abuts on or is seated on the mounting frame flange 92. The prefilter 72 is inserted in the mouth 88 of the mounting frame 74, until its frame 82 abuts on or is seated on the cube filter flange 79. The prefilter 72 is telescopically received within the band 90 of the mounting frame 74, while the bosses 96 serve to space the filter frame 82 slightly from the band 90, for ready insertion and removal, and to hold the prefilter in place.

Referring to FIGS. 4–6, the filter assemblies 65 are mounted in the suction openings 60 with the prefilters 72 thereof adjacent to the conveyor openings 32 and 50, and facing inwardly. The bodies 69 of the cube filters 68 extend laterally outwardly, into the vacuum space 38 in respective cells 36a and 36b of the vacuum chamber 36.

The mounting frames 74 are mounted to appropriate ones of the room end wall 18, the vestibule outer end wall 48, and the inner side wall sections 58, by fasteners inserted through the mounting holes 96, or by other suitable means. The vacuum chamber cells 36a and 36b thus are disposed laterally proximate to a conveyor extending outwardly from the room 10 through an adjacent conveyor opening 32, in communication through the filter assemblies 65 with discharge air emanating from the conveyor opening.

In operation, the air conditioning units 28 condition and blow air from the return air conduits 30, into the air supply conduits 26, and thence into diffuser structure at the top of the room 10, to supply fresh air to the room and maintain the room space 12 in a pressurized condition. The room air pressure causes air to discharge through the conveyor openings 32, around the conveyor and work 33 (FIG. 3), while the suction sides of the blowers in the units 28 provide a suction or a partial vacuum in the return air conduits 30 and thence in the vacuum spaces 38 of the vacuum chambers 36.

The vacuum chambers 36, acting through the filter assemblies 65, provide suction proximate to the conveyor openings 32, to induce the flow of room discharge air to the chambers. The air flows through the filter assemblies 65, to remove particles 2 microns in size and larger. The filtered air under suction then flows through the vacuum chambers 36 and the return air conduits 30 to the air conditioning units 28, where its temperature and humidity are adjusted as necessary, and it is discharged to the air supply conduits 26 under pressure, for recycling to the room 10. In this manner, the energy previously lost in air escaping through the conveyor openings 32, and the energy and equipment required to condition air replacing the air that has escaped are greatly reduced.

Inasmuch as the vacuum chambers 36 are also in communication with the conveyor openings 50 in the outer end walls 48 of the vestibules 34, plant environmental air outside of such walls may be drawn through such openings and through the filter assemblies 65, to be supplied to the air conditioning units 28 and thence the room 10. As much makeup air as needed to compensate for air losses from the room 10 may be added to the air cycling system by such means, while a maximum amount of room air is recycled.

The combined action of the discharge air exiting the room wall conveyor openings 32, and the suction applied at the vacuum chamber openings 60 insures that substantially no contamination of the room air with outside environmental air will occur at this point. Employing a preferred system in which all of the recycled air is obtained via the room conveyor openings 32, with no air recycled directly from the room 10 via filters in a room wall, the velocity of the discharge air through the conveyor openings 32 may be substantially greater than the recommended minimum velocity, depending upon the area of the conveyor openings 32, to further reduce the likelihood of contamination.

While in the foregoing preferred embodiment, the vestibules 34 with their vacuum chambers 36 are mounted on the outside of the room 10, they may be mounted, alternatively, on the inside of the room proximate to the conveyor openings 32. However, the illustrative embodiment is preferred, for reasons of room space conservation, access to the vestibules and the filter assemblies, and minimization of dirt or dust collectors within the room.

Second Embodiment

FIG. 9 illustrates a second controlled environment room 100, of smaller size and lower air conditioning requirement, having a lesser number of filter assemblies 65, in another arrangement. Conveyor entrance and exit vestibules 102 and 104 are constructed with single-cell vacuum chambers 106 and 108, respectively. Each of the chambers 106 and 108 has a plurality of contiguous filter assemblies 65 mounted in a suction or induction opening 110 or 112 therein, the number depending upon the air conditioning requirement and the capacity of the filter assemblies.

The second room 100 is provided with conveyor entrance and exit openings 114 and 116, in opposite end walls 118 and 120, respectively. The vestibules 102 and 104 are provided with respective conveyor entrance and exit openings 122 and 124. In this embodiment, a conveyor bearing work parts (not shown) travels along a right-angled path, represented by a broken line 126. The conveyor enters the entrance vestibule 102 through the entrance opening 122 in a direction parallel to the adjacent end wall 118. It then turns to enter the conveyor opening 114 in such end wall and exit the conveyor opening 116 in the opposite end wall 120, and also exit the conveyor opening 124 in the exit vestibule 104, in a direction perpendicular to the end walls. Also illustrated in FIG. 9 are a double door 128 and a single door 130 in the respective end walls 118 and 120, from which pressurized room air escapes when the doors are opened, and must be replaced.

The vacuum chambers 106 and 108 are arranged to provide suction proximate to the respective end wall conveyor openings 114 and 116, for recycling room air. Makeup air may be drawn through the conveyor openings 122 and 124 in the respective vestibules 102 and 104, and into the vacuum chambers.

The vacuum chambers 106 and 108 are connected by conduits (not shown) to an air conditioning unit or units, such as the units 28 (FIGS. 1–3). It has been found desirable to locate the air conditioning equipment on the roof of the plant that houses the room 100, in one instance, with a room air supply conduit leading back to the room from the equipment.

The structure and arrangement of the vestibules and the vacuum chambers may be varied from the illustrative embodiments shown in the drawings. The location and arrangement of the air conduits and air conditioning units also may be varied. It will be apparent to those skilled in the art that these and other changes and modifications may be made in the preferred embodiments, within the spirit and scope of the invention. It is intended that all such changes and modifications be included within the scope of the claims.

We claim:

1. Energy conservation means for a controlled environment room maintained at superatmospheric pressure therein and having an opening in a wall thereof through which work is passed and through which room air under said pressure is discharged from the room, thereby to prevent contamination of the room air by contaminants in outside air entering the room through said opening, comprising means for providing suction proximate to said opening to induce the flow thereto of said room air being discharged under said pressure, and means communicating with said suction-providing means for recycling the discharged air of said induced flow at superatmospheric pressure to said room.

2. Energy conservation means as defined in claim 1 and including air filter means mounted in said suction-providing means.

3. Energy conservation means as defined in claim 1 wherein said suction-providing means comprises a vacuum chamber in communication with said air being discharged.

4. Energy conservation means as defined in claim 3 wherein said vacuum chamber is provided with an opening therein for said communication, and air filter means are mounted in said latter opening.

5. Energy conservation means as defined in claim 4 wherein said means for recycling includes blower means.

6. In an air supply system for a controlled environment room maintained at superatmospheric pressure therein, including means for filtering, conditioning, and blowing return and makeup air for supply at superatmospheric pressure to said room, said room having an opening in a room wall through which work is moved between the outside and the inside of the room, and through which room air under said pressure is discharged from the room, thereby to prevent contamination of the room air by contaminants in outside air entering the room through said opening, energy conservation means comprising means for providing suction proximate to said opening to induce the flow thereto of said room air being discharged under said pressure, and means for conducting the discharged air of said induced flow to said filtering, conditioning, and blowing means.

7. An air supply system as defined in claim 6 wherein said suction-providing means comprises a vacuum chamber in communication with said air being discharged.

8. An air supply system as defined in claim 7 wherein said vacuum chamber is provided with an opening therein for said communication, said filtering means are mounted in said latter opening, and said conducting means includes conduit means connecting said vacuum chamber to said conditioning and blowing means.

9. In combination with a controlled environment room maintained at superatmospheric pressure therein and having an opening in a wall thereof through which work is passed and through which room air under said pressure is discharged from the room, thereby to prevent contamination of the room air by contaminants in outside air entering the room through said opening, energy conservation means comprising means for providing suction proximate to said opening to induce the flow thereto of said room air being discharged under said pressure, and means communicating with said suction-providing means for recycling the discharged air of said induced flow at superatmospheric pressure to said room.

10. A combination as defined in claim 9 and including a work conveyor extending through said opening, and wherein said suction-providing means comprises a vacuum chamber disposed laterally proximate to said conveyor in communication with said room air being discharged through said opening.

11. In combination with a controlled environment room maintained at superatmospheric pressure therein and having an opening in a wall thereof through which work is passed and through which room air under said pressure is discharged from the room, thereby to prevent contamination of the room air by contaminants in outside air entering the room through said opening, a work conveyor extending through said opening, energy conservation means comprising means for providing suction proximate to said opening to induce the flow thereto of said room air being discharged under said pressure, and means communicating with said suction-providing means for recycling the discharged air of said induced flow at superatmospheric pressure to said room.

12. A combination as defined in claim 11 and wherein said recycling means includes blowing means for supplying said air under superatmospheric pressure to said room.

13. A combination as defined in claim 12 and wherein said suction-providing means comprises a vacuum chamber disposed laterally proximate to said conveyor in communication with said room air being discharged through said opening.

* * * * *